(12) United States Patent
Ferguson et al.

(10) Patent No.: US 9,575,490 B2
(45) Date of Patent: *Feb. 21, 2017

(54) MAPPING ACTIVE AND INACTIVE CONSTRUCTION ZONES FOR AUTONOMOUS DRIVING

(71) Applicant: Google Inc., Mountain View, CA (US)

(72) Inventors: David I. Ferguson, San Francisco, CA (US); Donald Jason Burnette, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/828,700

(22) Filed: Aug. 18, 2015

(65) Prior Publication Data

US 2015/0355640 A1    Dec. 10, 2015

Related U.S. Application Data

(62) Division of application No. 13/859,990, filed on Apr. 10, 2013, now Pat. No. 9,141,107.

(51) Int. Cl.
*G05D 1/00* (2006.01)
*G01C 21/26* (2006.01)
(Continued)

(52) U.S. Cl.
CPC ............ *G05D 1/0088* (2013.01); *B60W 30/00* (2013.01); *G01C 21/26* (2013.01); *G01C 21/32* (2013.01);
(Continued)

(58) Field of Classification Search
CPC ............... B60W 2420/42; B60W 2550/22; B60W 2550/14; B60W 2550/402; B60W 40/06; B60K 35/00; B60R 2021/0004; B60R 2021/0006; B60R 2021/0018; B60T 1/10; B60T 2201/08; B60T 7/12; B60T 7/18; B60T 7/22; H04N 7/18; B62D 15/025; B62D 15/0255; B62D 15/0265; G01S 2013/9332; G01S 2013/936; G01S 2013/9375; G01S 2013/9378; G01S 2013/9385; G05D 2201/0213; G06K 9/78; G08G 1/16
(Continued)

(56) References Cited

U.S. PATENT DOCUMENTS 5,170,352 A    12/1992   McTamaney et al.
7,606,579 B2   10/2009   Thacher
(Continued)

FOREIGN PATENT DOCUMENTS

CN    101966846 A    2/2011
CN    102314596 A    1/2012
(Continued)

OTHER PUBLICATIONS

Henry Fountain, Yes, Driverless Cars Know the Way to San Jose, The New York Times, Oct. 26, 2012, 5 pages.
(Continued)

*Primary Examiner* — Behrang Badii
*Assistant Examiner* — Sanjeev Malhotra
(74) *Attorney, Agent, or Firm* — Lerner, David, Littenberg, Krumholz & Mentlik, LLP

(57) ABSTRACT

Aspects of the present disclosure relate to differentiating between active and inactive construction zones. In one example, this may include identifying a construction object associated with a construction zone. The identified construction object may be used to map the area of the construction zone. Detailed map information may then be used to classify the activity of the construction zone. The area of the construction zone and the classification may be added to the
(Continued)

detailed map information. Subsequent to adding the construction zone and the classification to the detailed map information, the construction object (or another construction object) may be identified. The location of the construction object may be used to identify the construction zone and classification from the detailed map information. The classification of the classification may be used to operate a vehicle having an autonomous mode.

20 Claims, 11 Drawing Sheets

(51) Int. Cl.
  *B60W 30/00*    (2006.01)
  *G06K 9/00*    (2006.01)
  *G01C 21/32*    (2006.01)
  *G01S 13/93*    (2006.01)

(52) U.S. Cl.
  CPC ...... *G05D 1/00* (2013.01); *G06K 9/00* (2013.01); *G01S 2013/936* (2013.01); *G05D 2201/0213* (2013.01)

(58) Field of Classification Search
  USPC ............ 701/31.4, 36, 45, 50, 465; 382/199; 348/118; 345/418; 340/901; 40/606.02
  See application file for complete search history.

(56) References Cited

U.S. PATENT DOCUMENTS

| | | | | |
|---|---|---|---|---|
| 2004/0236489 A1* | 11/2004 | Shibamori | ............ | B60R 25/00 701/50 |
| 2005/0267658 A1* | 12/2005 | Yuan | ................. | B60W 30/146 701/36 |
| 2005/0278098 A1* | 12/2005 | Breed | ................ | B60R 21/0134 701/45 |
| 2008/0161986 A1 | 7/2008 | Breed | | |
| 2008/0234927 A1* | 9/2008 | O'Neill | ............ | G08G 1/096811 701/465 |
| 2009/0002193 A1* | 1/2009 | Cemper | ............ | G08G 1/096783 340/901 |
| 2009/0278839 A1* | 11/2009 | Geis | ....................... | G06Q 10/06 345/418 |
| 2010/0104199 A1* | 4/2010 | Zhang | ................. | G06K 9/00798 382/199 |
| 2010/0106356 A1 | 4/2010 | Trepagnier et al. | | |
| 2010/0207787 A1 | 8/2010 | Catten et al. | | |
| 2010/0283905 A1 | 11/2010 | Yamamoto et al. | | |
| 2011/0010974 A1* | 1/2011 | White | .................... | E01F 9/692 40/606.02 |
| 2011/0190972 A1* | 8/2011 | Timmons | ............... | G01C 21/34 701/31.4 |
| 2012/0109423 A1 | 5/2012 | Pack et al. | | |
| 2012/0239240 A1 | 9/2012 | Nakano et al. | | |
| 2012/0283905 A1 | 11/2012 | Nakano et al. | | |
| 2014/0063232 A1* | 3/2014 | Fairfield | .................. | G06K 9/78 348/118 |

FOREIGN PATENT DOCUMENTS

| | | |
|---|---|---|
| EP | 2402226 A1 | 1/2012 |
| JP | 2002213976 A | 7/2002 |
| JP | 2007085838 A | 4/2007 |
| KR | 20110074629 A | 6/2011 |

OTHER PUBLICATIONS

News Staff, Challenges Faced by Google's Autonomous Vehicles, Government Technology, Mar. 4, 2013, 3 pages.
International Search Report and Written Opinion for Application No. PCT/US2014/033325 dated Aug. 21, 2014.
Extended European Search Report dated Jul. 13, 2016, for European Patent Application No. 14782618.4.
Notification of First Office Action dated Aug. 15, 2016, for Chinese Patent Application No. 201480028705.2.
Office Action for Japanese Patent Application No. 2016-507605, dated Nov. 24, 2016.

* cited by examiner

MAPPING ACTIVE AND INACTIVE CONSTRUCTION ZONES FOR AUTONOMOUS DRIVING

CROSS-REFERENCE TO RELATED APPLICATIONS

The present application is a divisional of U.S. patent application Ser. No. 13/859,990, filed Apr. 10, 2013, the disclosure of which is incorporated herein by reference.

BACKGROUND

Autonomous vehicles use various computing systems to aid in the transport of passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual driving mode (where the operator exercises a high degree of control over the movement of the vehicle) to an autonomous driving mode (where the vehicle essentially drives itself) to modes that lie somewhere in between.

When operating in the autonomous mode, these vehicles may rely heavily on pre-stored map data. Because of this, constructions zones may present significant challenges to autonomous vehicles. In particular, these areas may potentially change quickly, causing prior map data of the areas to be inaccurate or obsolete. Thus, detecting construction zones is not only important, but also deciding how the vehicle should maneuver through these zones is important. Typically, upon identifying or coming upon a construction zone, an autonomous vehicle may automatically transfer control of the vehicle to the driver in order to ensure the safety of the driver and any other passengers. However, this may be frustrating to the driver where the construction zone would not actually present a driving challenge to the autonomous vehicle such as on highways with long term construction projects.

BRIEF SUMMARY

Aspects of the disclosure provide a method. The method includes identifying a first construction object associated with a construction zone; mapping an area of the construction zone based on the identified construction object; classifying, by a processor, an activity type of the construction zone based on detailed map information; adding the area of the construction zone and the classification to the detailed map information; subsequent to adding the construction zone and the classification to the detailed map information, identifying a second construction object at a given location; identifying, from the detailed map information, the area of the construction zone and the classification based on the given location; and operating, at the area of the construction zone, a vehicle having an autonomous driving mode based on the classification stored in the detailed map information.

In one example, classifying the activity type of the construction zone includes determining whether there have been any changes to the area of the construction zone from the detailed map information. In another example, the activity type of the construction zone is classified as inactive when the features of the construction zone correspond to the features of the detailed map information for that area. In this example, when the activity type of the construction zone is classified as inactive, operating the vehicle based on the classification includes operating the vehicle in the autonomous driving mode through the area of the construction zone.

In another example, the activity type of the construction zone is classified as active when the features of the construction zone indicate that there have been changes to the roadway as compared to the detailed map information. In this example, when the activity type of the construction zone is classified as active, operating the vehicle based on the classification includes operating the vehicle in the manual driving mode through the area of the construction zone.

In another example, operating the vehicle based on the classification includes determining whether to drive the vehicle in the autonomous driving mode or a manual driving mode. In another example, the method also includes after operating the vehicle based on the classification reclassifying the activity type of the construction zone and updating the classification of the construction zone in the detailed map information based on the reclassifying. In this example, the method also includes sending the updated classification to a remote computer. In another example, the second construction object is the first construction object.

Another aspect of the disclosure provides a method. The method includes receiving information identifying a construction zone and a classification of an activity type of the construction zone; adding an area of the construction zone and the classification to detailed map information; subsequent to adding the area of the construction zone and the classification to the detailed map information, identifying, by a processor, a construction object at a given location; and operating a vehicle having an autonomous driving mode based on the classification stored in the detailed map information.

In one example, the method also includes, after operating the vehicle based on the classification, reclassifying the activity type of the construction zone and updating the classification of the construction zone in the detailed map information based on the reclassifying. In another example, operating the vehicle based on the classification includes determining whether to drive the vehicle in the autonomous driving mode or a manual driving mode. In another example, the information identifying the construction zone is further received with instructions for controlling the driving behaviors of the vehicle in the area of the construction zone and wherein operating the vehicle is further based on the instructions for controlling the driving behaviors.

A further aspect of the disclosure provides a system. The system includes memory storing detailed map information and a processor. The processor is configured to identify a first construction object associated with a construction zone; map an area of the construction zone based on the identified construction object; classify an activity type of the construction zone based on the detailed map information; add the area of the construction zone and the classification to the detailed map information; subsequent to adding the construction zone and the classification to the detailed map information, identify a second construction object at a given location; identify, from the detailed map information, the area of the construction zone and the classification based on the given location; and operate, at the area of the construction zone, a vehicle having an autonomous driving mode based on the classification stored in the detailed map information.

In one example, classifying the activity type of the construction zone includes determining whether there have been any changes to the area of the construction zone from the detailed map information. In another example, the activity type of the construction zone is classified as inactive when the features of the construction zone correspond to the features of the detailed map information for that area. In another example, operating the vehicle based on the classification includes determining whether to drive the vehicle in the autonomous driving mode or a manual driving mode. In another example, the processor is further configured to, after operating the vehicle based on the classification, reclassify the activity type of the construction zone and update the classification of the construction zone in the detailed map information based on the reclassifying. In another example, the processor is further configured to generate instructions for controlling the driving behaviors of the vehicle in the area of the construction zone and add the instructions for controlling the driving behaviors of the vehicle to the detailed map information with the area of the construction zone and the classification. In this example, operating at the area of the construction zone is further based on the instructions for controlling the driving behaviors of the vehicle.

DETAILED DESCRIPTION

The disclosure relates generally to mapping and classifying construction zones in order to improve safety and efficiency of autonomous vehicles. As an example, a first vehicle with access to a detailed map may be driven along a roadway in an autonomous or manual driving mode. The first vehicle may use its sensors to detect a construction zone, for example, by identifying a construction object such as a road work sign, cone, barrel, fence, construction vehicle, flare, or other items commonly associated with construction zones. Where the vehicle is being driven in an autonomous mode, upon identifying the construction object, the vehicle may switch to a manual mode or a very cautious driving mode. As the first vehicle is driving (or after it has driven) through the construction zone, the first vehicle may map the area of the construction zone and incorporate this construction zone information into the detailed map.

By comparing the detailed map information to the features of the roadway detected in the construction zone, such as the positioning of lane lines, whether lanes are closed, the presence and location of a new k-rail, etc., the first vehicle may determine whether the construction zone is active or inactive. In this regard, if changes to the aforementioned features are identified, then the construction zone may be classified as active. If no changes (or very minor changes) are identified, then the construction zone may be classified as inactive. This information may be associated with the construction zone information and incorporated into the detailed map. This information may also be shared with other vehicles in order to update their own detailed maps.

A second vehicle (or the first vehicle at a later time), may detect the construction zone by detecting a construction object such as road work signs, cones, barrels, fences, construction vehicles, flares, or other items commonly associated with construction zones. The second vehicle may then access the detailed map to determine whether the location of the detected construction object corresponds to a construction zone included and if so, whether the status of the construction zone associated with the detected object is identified as active or inactive. If the construction zone is active, the second vehicle may user a higher level of caution, by driving very slowly and perhaps transitioning from an autonomous to a manual mode. If the construction zone is inactive, the vehicle may continue to drive normally based on the information in the map. If the detected object is not in the map, the second vehicle may be driven under the higher level of caution and may add the detected object to the map. In addition, the second vehicle may also reclassify the construction zone.

Figure 1:
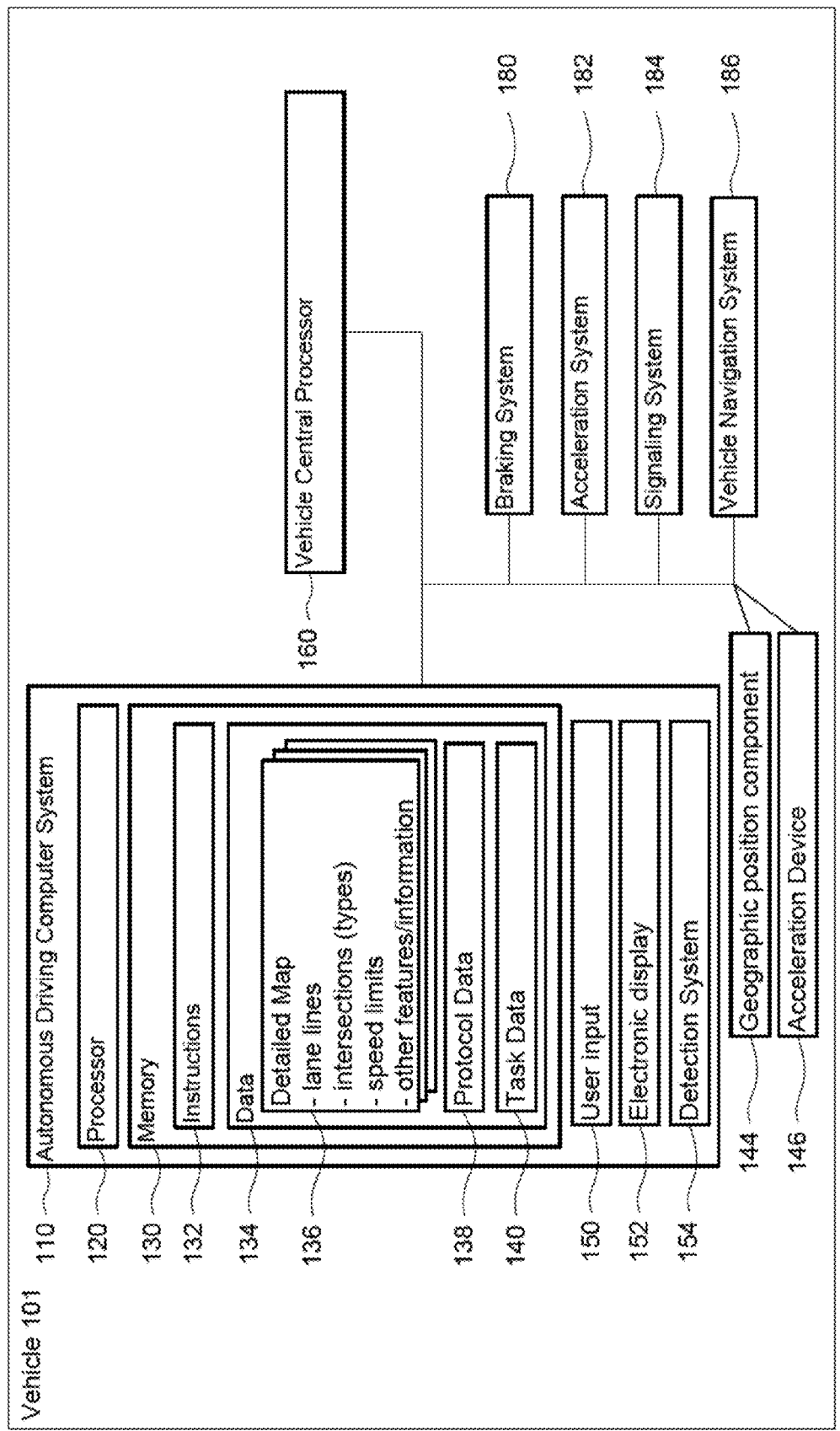
FIG. 1 is a functional diagram of a system in accordance with aspects of the disclosure.

As shown in FIG. 1, an autonomous driving system 100 in may include a vehicle 101 with various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercially available CPUs. Alternatively, the processor may be a dedicated device such as an ASIC or other hardware-based processor. Although FIG. 1 functionally illustrates the processor, memory, and other elements of computer 110 as being within the same block, it will be understood by those of ordinary skill in the art that the processor, computer, or memory may actually comprise multiple processors, computers, or memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel. Rather than using a single processor to perform the steps described herein, some of the components, such as steering components and deceleration components, may each have their own processor that only performs calculations related to the component's specific function.

In various aspects described herein, the processor may be located remote from the vehicle and communicate with the vehicle wirelessly. In other aspects, some of the processes described herein are executed on a processor disposed within the vehicle and others by a remote processor, including taking the steps necessary to execute a single maneuver.

Computer 110 may include all of the components normally used in connection with a computer such as a central processing unit (CPU), memory (e.g., RAM and internal hard drives) storing data 134 and instructions such as a web browser, an electronic display 152 (e.g., a monitor having a screen, a small LCD touch-screen or any other electrical device that is operable to display information), user input 150 (e.g., a mouse, keyboard, touch screen and/or microphone), as well as various sensors (e.g., a video camera) for gathering explicit (e.g., a gesture) or implicit (e.g., "the person is asleep") information about the states and desires of a person.

Figure 2:
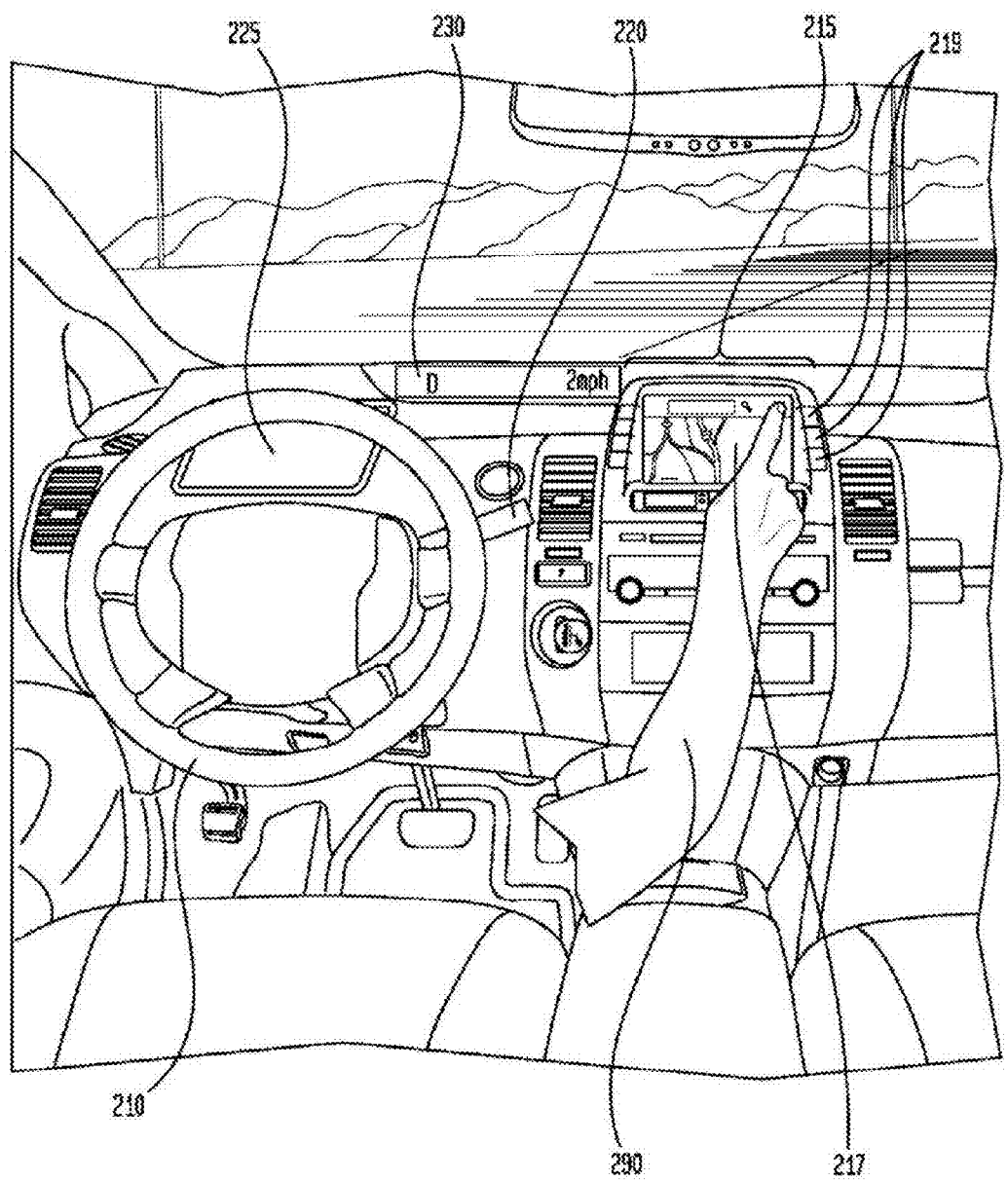
FIG. 2 is an interior of an autonomous vehicle in accordance with aspects of the disclosure.

In one example, computer 110 may be an autonomous driving computing system incorporated into vehicle 101. FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215 (which may be a part of electronic display 152); and a gear selector apparatus, such as gear shifter 220. The vehicle may also have various user input devices 140 in addition to the foregoing, such as touch screen 217 (which may be a part of electronic display 152), or button inputs 219, for activating or deactivating one or more autonomous driving modes and for enabling a driver or passenger 290 to provide information, such as a navigation destination, to the autonomous driving computer 110.

The autonomous driving computing system may be capable of communicating with various components of the vehicle. For example, returning to FIG. 1, computer 110 may be in communication with the vehicle's central processor 160 and may send and receive information from the various systems of vehicle 101, for example the braking system 180, acceleration system 182, signaling system 184, and navigation system 186 in order to control the movement, speed, etc. of vehicle 101. In one example, the vehicle's central processor 160 may perform all of the functions of a central processor in a non-autonomous computer. In another example, processor 120 and 160 may comprise a single processing device or multiple processing devices operating in parallel.

In addition, when engaged, computer 110 may control some or all of these functions of vehicle 101. Thus vehicle 101 may have various manual, semiautonomous, or autonomous driving modes as described above. It will be understood that although various systems and computer 110 are shown within vehicle 101, these elements may be external to vehicle 101 or physically separated by large distances.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it, which can often be determined with better accuracy than absolute geographical location.

The vehicle may also include other devices in communication with computer 110, such as an accelerometer, gyroscope or another direction/speed detection device 146 to determine the direction and speed of the vehicle or changes thereto. By way of example only, acceleration device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer 110 may control the direction and speed of the vehicle by controlling various components. By way of example, if the vehicle is operating in a completely autonomous driving mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

The vehicle may also include components for detecting objects external to the vehicle such as other vehicles, obstacles in the roadway, traffic signals, signs, trees, etc. The detection system 154 may include lasers, sonar, radar, cameras or any other detection devices which record data which may be processed by computer 110. For example, if the vehicle is a small passenger vehicle, the car may include a laser mounted on the roof or other convenient location.

Figure 3:
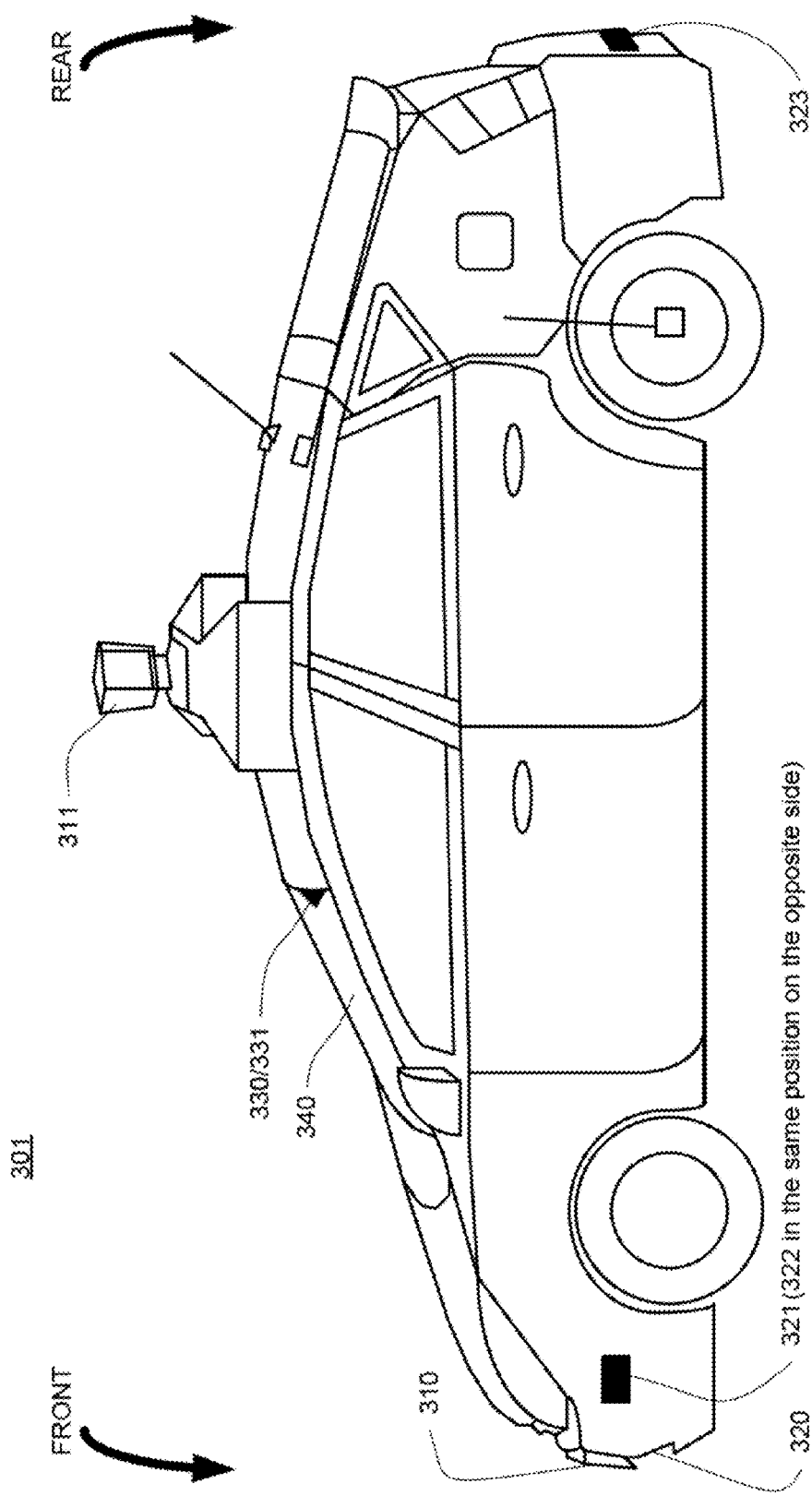
FIG. 3 is an exterior of an autonomous vehicle in accordance with aspects of the disclosure.

As shown in FIG. 3, vehicle 101 may include a small passenger vehicle having lasers 310 and 311, mounted on the front and top of the vehicle, respectively. Laser 310 may have a range of approximately 150 meters, a thirty degree vertical field of view, and approximately a thirty degree horizontal field of view. Laser 311 may have a range of approximately 50-80 meters, a thirty degree vertical field of view, and a 360 degree horizontal field of view. The lasers may provide the vehicle with range and intensity information which the computer may use to identify the location and distance of various objects. In one aspect, the lasers may measure the distance between the vehicle and the object surfaces facing the vehicle by spinning on its axis and changing its pitch.

The vehicle may also include various radar detection units, such as those used for adaptive cruise control systems. The radar detection units may be located on the front and back of the car as well as on either side of the front bumper. As shown in the example of FIG. 3, vehicle 101 includes radar detection units 320-323 located on the side (only one side being shown), front and rear of the vehicle. Each of these radar detection units may have a range of approximately 200 meters for an approximately 18 degree field of view as well as a range of approximately 60 meters for an approximately 56 degree field of view.

In another example, a variety of cameras may be mounted on the vehicle. The cameras may be mounted at predetermined distances so that the parallax from the images of 2 or more cameras may be used to compute the distance to various objects. As shown in FIG. 3, vehicle 101 may include 2 cameras 330-331 mounted under a windshield 340 near the rear view mirror (not shown). Camera 330 may include a range of approximately 200 meters and an approximately 30 degree horizontal field of view, while camera 331 may include a range of approximately 100 meters and an approximately 60 degree horizontal field of view.

In addition to the sensors described above, the computer may also use input from other sensors and features typical to non-autonomous vehicles. For example, these other sensors and features may include tire pressure sensors, engine temperature sensors, brake heat sensors, break pad status sensors, tire tread sensors, fuel sensors, oil level and quality sensors, air quality sensors (for detecting temperature, humidity, or particulates in the air), door sensors, lights, wipers, etc. This information may be provided directly from these sensors and features or via the vehicle's central processor 160.

Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

In addition to processing data provided by the various sensors, the computer may rely on environmental data that was obtained at a previous point in time and is expected to persist regardless of the vehicle's presence in the environment. For example, returning to FIG. 1, data 134 may include detailed map information 136, e.g., highly detailed maps identifying the shape and elevation of roadways, lane lines, intersections, crosswalks, speed limits, traffic signals, buildings, signs, real time traffic information, vegetation, or other such objects and information. For example, the map information may include explicit speed limit information associated with various roadway segments. The speed limit data may be entered manually or scanned from previously taken images of a speed limit sign using, for example, optical-character recognition.

Figure 4:
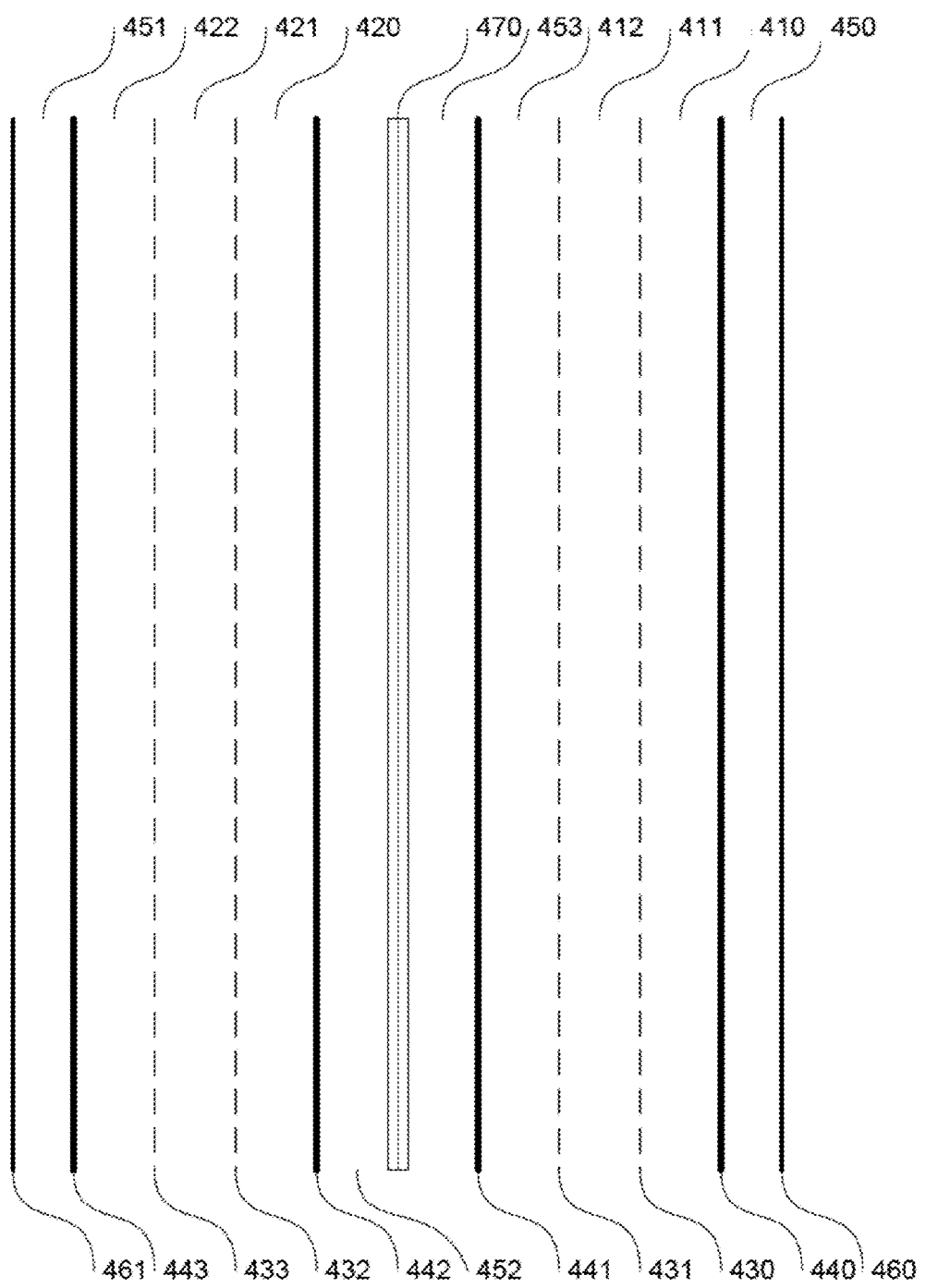
FIG. 4 is an example of a roadway in accordance with aspects of the disclosure.

FIG. 4 is an example of a highway 400. In this example, highway 400 includes 3 northbound lanes 410-412 and 3 southbound lanes 420-22 defined by broken lane lines 430-33 and solid lane lines 440-43. Highway 400 also includes shoulders 450-51 defined between solid lane line 440 and barrier 460 and solid lane line 441 and barrier 461, respectively. Between the northbound and southbound lanes, highway 400 includes a median 470 which defines shoulders 452 and 453 with lane lines 442 and 441, respectively.

Figure 5:
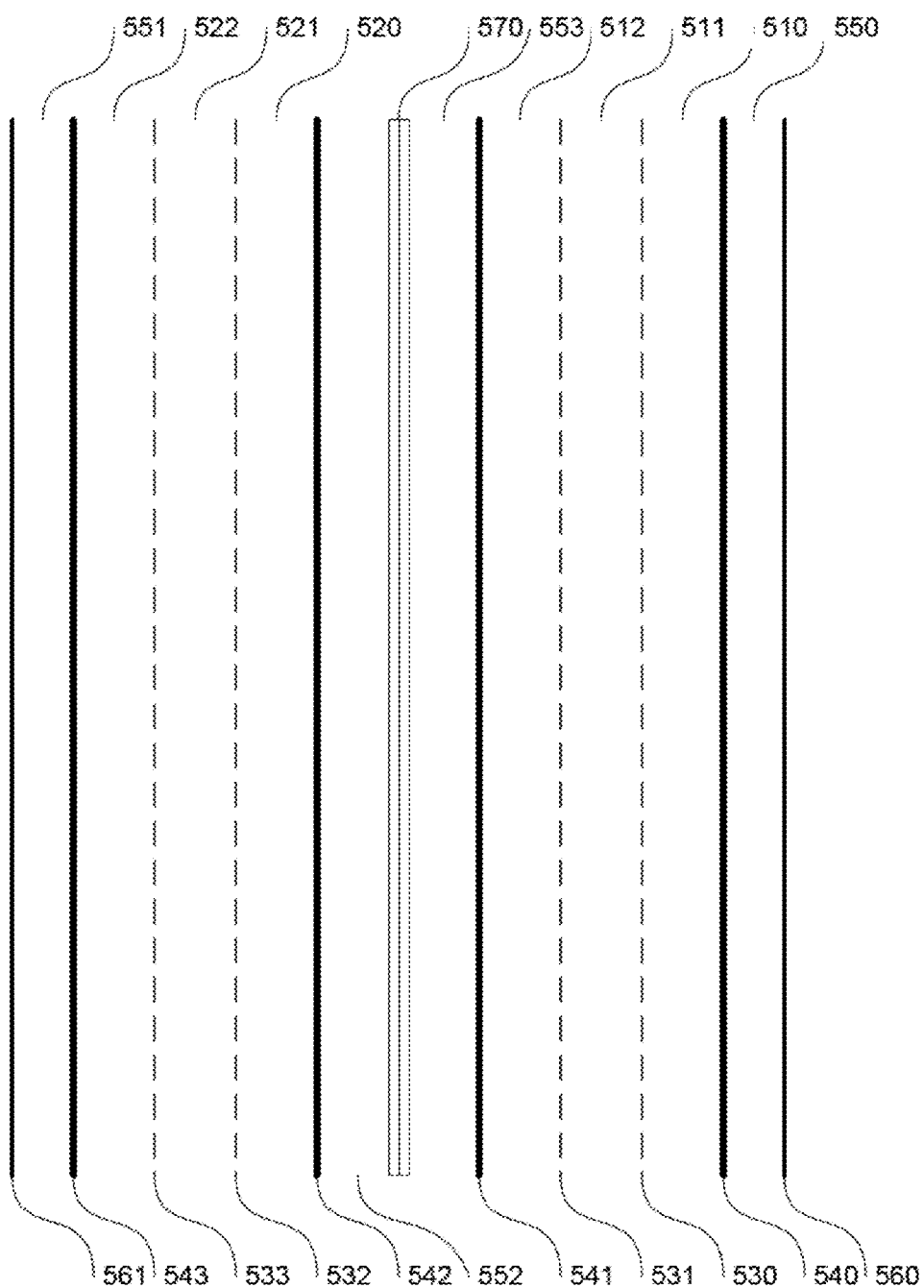
FIG. 5 is an example of detailed map information in accordance with aspects of the disclosure.

FIG. 5 is an example of detailed map information 500 for highway 400. Detailed map information 500 may be a portion of the detailed map information 136 and may include data indicating the location and orientation of the various features of highway 400. For example, detailed map information 500 includes northbound lane data 510-512 identifying northbound lanes 410-412 as well as southbound lane data 520-522 identifying southbound lanes 420-22. Detailed map information 500 also includes broken lane line data 530-33 and solid lane lines 540-43 representing broken lane lines 430-33 and solid lane lines 440-43. Shoulders 450-53 are also represented by shoulder data 550-553. Barriers 460-61 are represented by barrier data 560-61, and median 470 is represented by median data 570.

Figure 6:
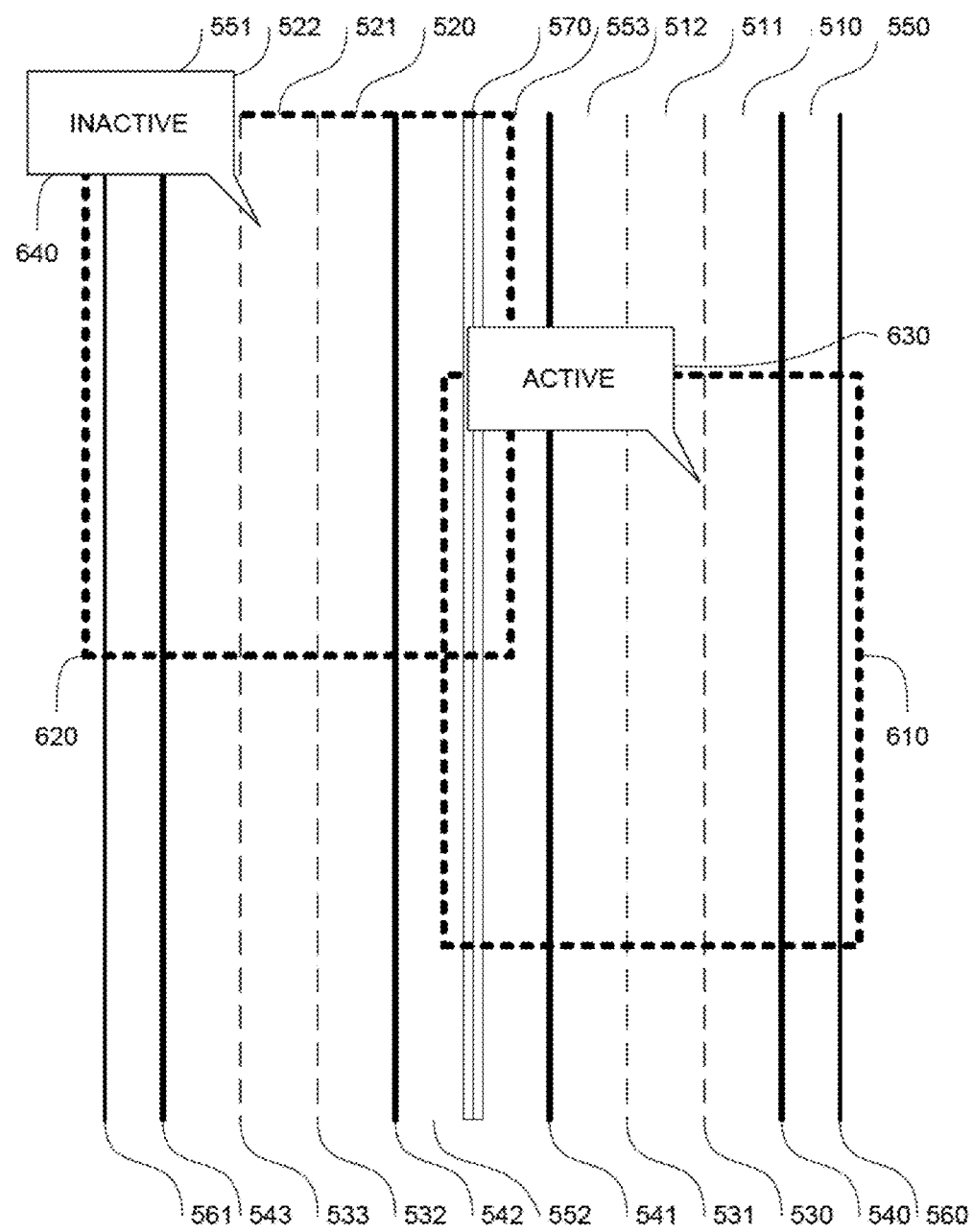
FIG. 6 is another example of detailed map information in accordance with aspects of the disclosure.

The detailed map information may also include information regarding construction zone areas. This may include location information defining the boundaries of construction zone areas. For example, FIG. 6 is an example of map information 500 including construction zone areas 610 and 620.

These construction zone areas may also be associated with a classification based on the most recent analysis of the activity of the construction zone. As an example, a construction zone area may be classified as active or inactive depending upon the characteristics of the features in the construction zone area. Referring to FIG. 6 construction zone area 610 includes an active designation 630 and construction zone area 620 includes an inactive designation 640.

Although the detailed map information 136 is depicted herein as an image-based map, the map information need not be entirely image based (for example, raster). The map information may include one or more roadgraphs or graph networks of information such as roads, lanes, intersections, and the connections between these features. Each feature may be stored as graph data and may be associated with information such as a geographic location whether or not it is linked to other related features. For example, a stop sign may be linked to a road and an intersection. In some examples, the associated data may include grid-based indices of a roadgraph to promote efficient lookup of certain roadgraph features.

Figure 7A:
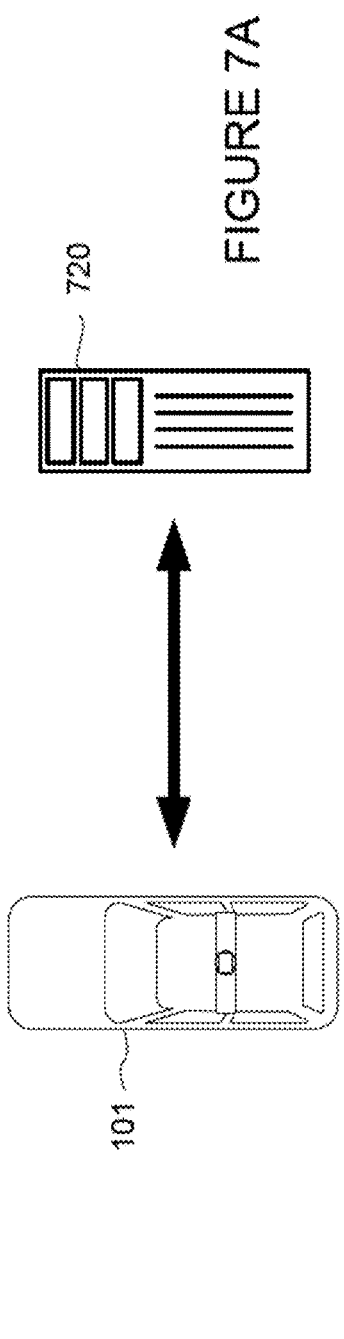
FIG. 7A is a pictorial diagram of a system in accordance with aspects of the disclosure.
Figure 7B:
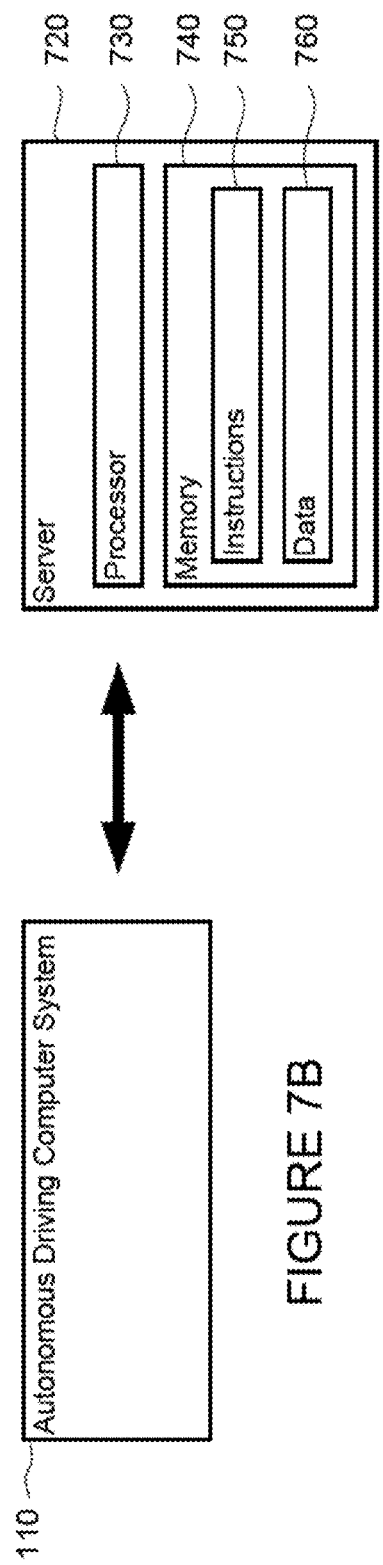
FIG. 7B is a functional diagram of a system in accordance with aspects of the disclosure.

Computer 110 may also receive or transfer information to and from other computers. For example, the map information stored by computer 110 may be received or transferred from other computers and/or the sensor data collected from the sensors of vehicle 101 may be transferred to another computer for processing as described herein. As shown in FIGS. 7A and 7B, data from computer 110, such as sensor information, may be transmitted via a network to a central processing computer 720 for further processing. Similarly, data from computer 720, such as software updates or weather information as described below, may be transmitted via the network to computer 110 or other similar computers of other vehicles having an autonomous driving mode.

The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems and wireless interfaces. In another example, data may be transferred by storing it on memory which may be accessed by or connected to computers 110 and 720.

In one example, computer 720 may comprise a server having a plurality of computers, e.g., a load balanced server farm, that exchange information with different nodes of a network for the purpose of receiving, processing and transmitting the data to and from computer 110. The server may be configured similarly to the computer 110, with a processor 730, memory 740, instructions 750, and data 760.

In addition to the operations described above and illustrated in the figures, various operations will now be described. It should be understood that the following operations do not have to be performed in the precise order described below. Rather, various steps can be handled in a different order or simultaneously, and steps may also be added or omitted.

As an example, a first vehicle may be driven along a roadway. This first vehicle may include vehicle 101 and may be operating in an autonomous driving mode, a manual driving mode, or a mode that lies somewhere between these. Alternatively, this first vehicle may also be a non-autonomous vehicle driven simply for the purpose of collecting sensor information about the environment.

Figure 8:
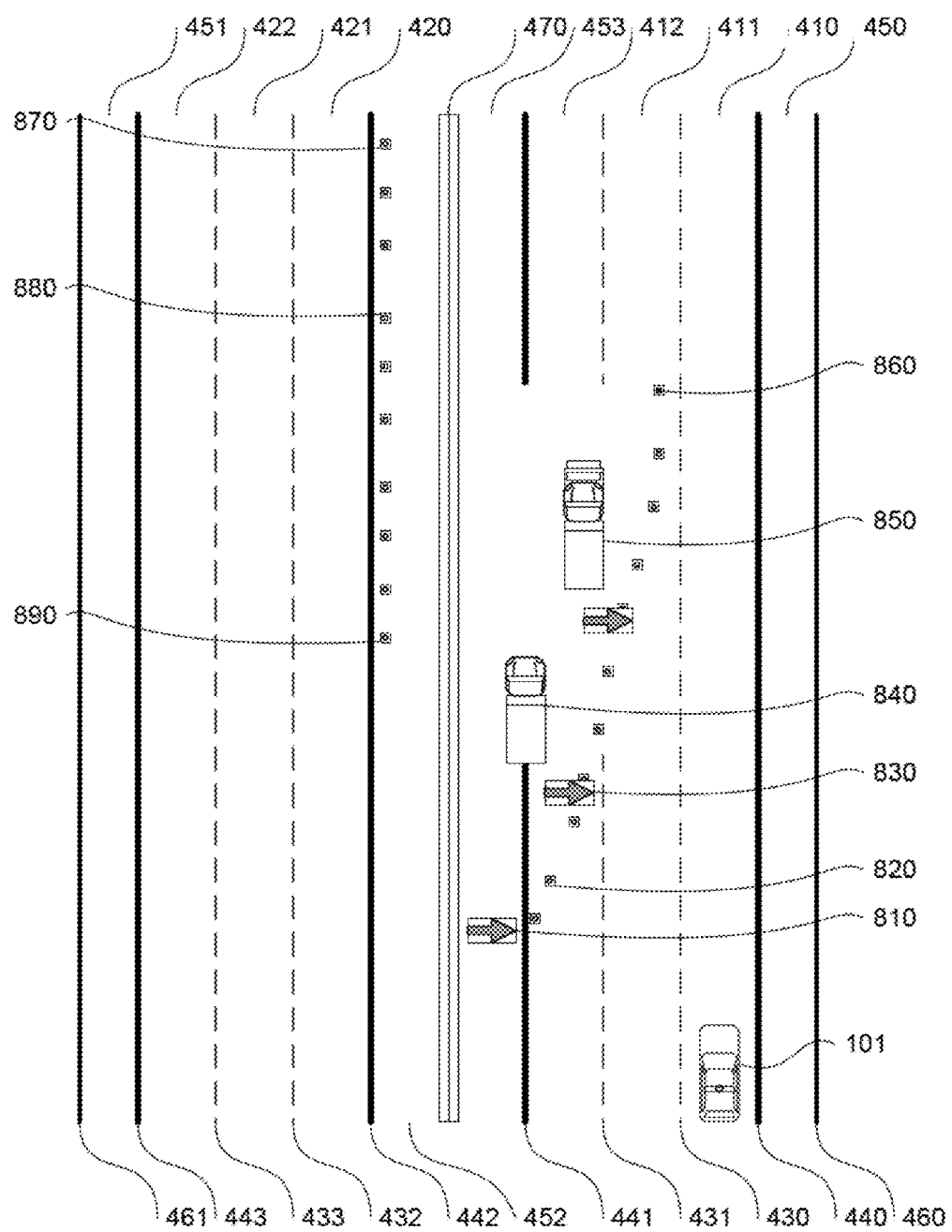
FIG. 8 is another example of the roadway of FIG. 4 in accordance with aspects of the disclosure.

FIG. 8 is an example of vehicle 101 driving along North-bound lane 410 of roadway 400 where construction vehicles 840 and 850 are repaving and painting lane lines of the roadway. In this example, vehicle 101 is approaching a construction zone as indicated by the various construction objects 810, 820, 830, 840, 850, and 860. This example also includes construction objects 870, 880, and 890 indicating that shoulder 453 is closed.

As the vehicle is driven, sensors may collect information about the vehicle's environment. The information from the vehicle's sensors may be used to detect construction zones. For example, sensor information may be used to identify construction objects such as road work signs, cones, barrels, fences, construction vehicles, flares, or other items commonly associated with construction zones. For example, computer 110 of vehicle 101 may detect construction objects 810, 820, 830, 840, 850, and 860 in North-bound lanes 410-412. In another example, a vehicle driving in South-bound lanes 420-422 may detect construction objects 870, 880, and 890.

These construction objects may be identified using any number of techniques such as by comparison of sensor data to the detailed map information, image matching, probability filters, image templates, etc. For example, techniques described in U.S. Pat. No. 8,195,394, U.S. patent application Ser. No. 13/361,083, entitled VEHICLE CONTROL BASED ON PERCEPTION UNCERTAINTY, and/or U.S. patent application Ser. No. 13/799,829, entitled HIGH-ACCURACY REAL-TIME ROAD SIGN DETECTION FROM IMAGES, may be used to identify construction objects.

In some examples, where the vehicle is being driven in an autonomous mode, upon identifying a construction object, the vehicle may automatically warn the driver and switch to a manual mode. Alternatively, the vehicle may warn the driver and computer 110 may switch to a very cautious driving mode, for example, by driving more slowly, increasing the distance between the vehicle and other objects in the roadway, etc.

Once a construction object is detected, the construction area may be mapped. For example, computer 110 may detect any number of additional construction objects or determine when the features of the roadway once again correspond to the detailed map information. Thus, a starting point, based on the location of the first construction object, and an ending point may be identified based on the location of the last identified construction object. The area along the roadway between these points may be the construction zone. In some examples, some buffer area may be added to the construction area by adding some distance beyond the last detected construction object.

As an example, computer 110 may detect construction object 810 and begin mapping a construction area. Once the last construction object has been detected, such as construction object 860, computer 110 may use this information to define a construction zone area 910 of FIG. 9. Similarly, a vehicle detecting construction objects 870 and 890 may define a construction zone 1010 of FIG. 10.

In addition to mapping the construction zone, it may also be classified by the system. As an example, a construction zone may be classified as active or inactive based on upon the characteristics of the construction zones. This classification may be accomplished by comparing the detailed map information to the features, other than those used to identify the construction zone, of the roadway detected in the construction zone. This may include comparing the positioning of lane lines, whether lanes are closed, the presence and location of a new k-rail or other barrier, etc. If any differences or changes to the aforementioned features are identified, then the construction zone may be classified as active. If no changes or very minor changes, are identified, then the construction zone may be classified as inactive. Examples of minor changes may include those that would not affect the autonomous driving, such as changes outside of the road lanes including shoulder work or moving a divider in a way that would not affect the vehicle's localization systems, or a slight lane shift that is small enough that driving within the previously mapped lane from the detailed map information would still be safe or comfortable to the driver.

Figure 9:
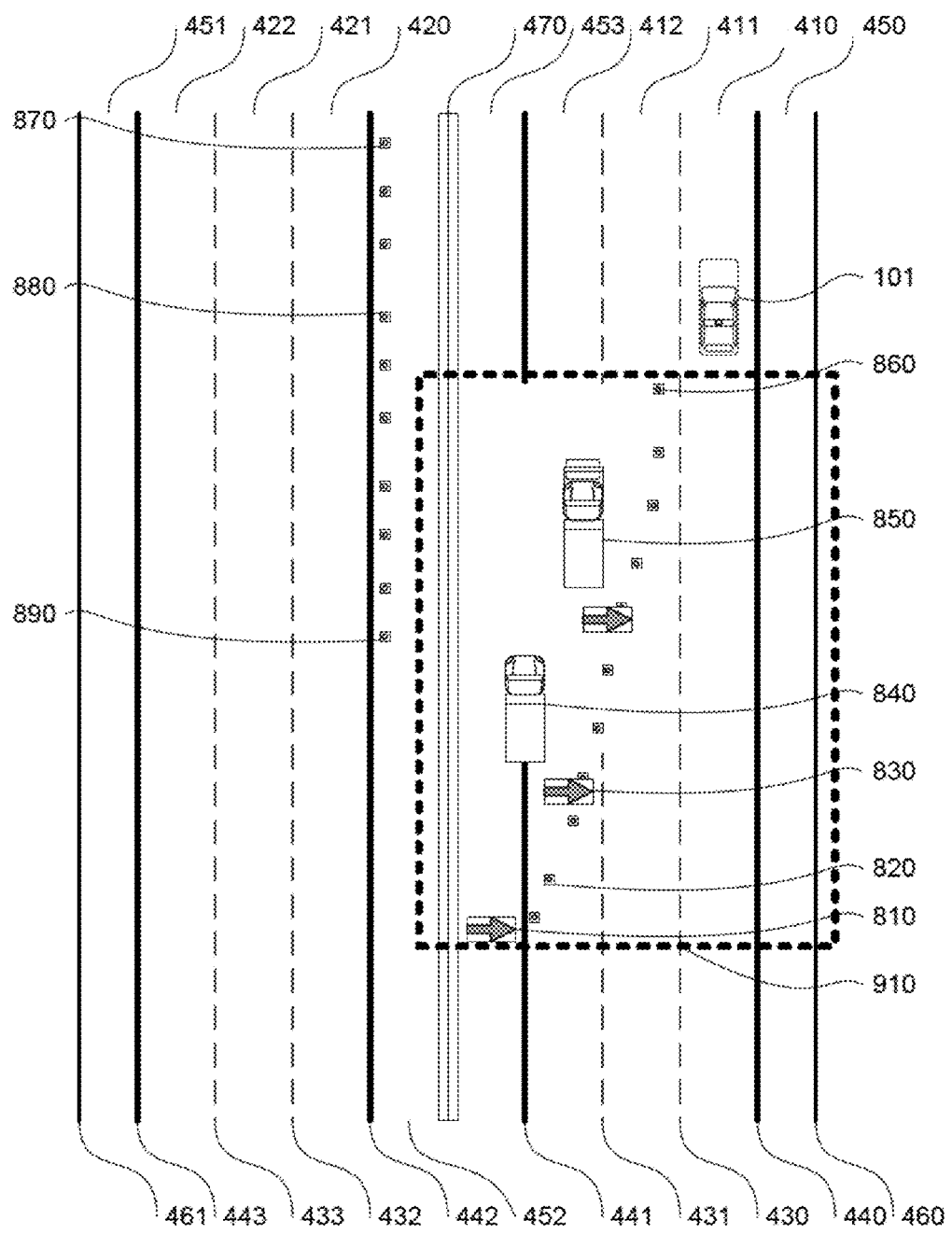
FIG. 9 is another example of the roadway of FIG. 4 in accordance with aspects of the disclosure.
Figure 10:
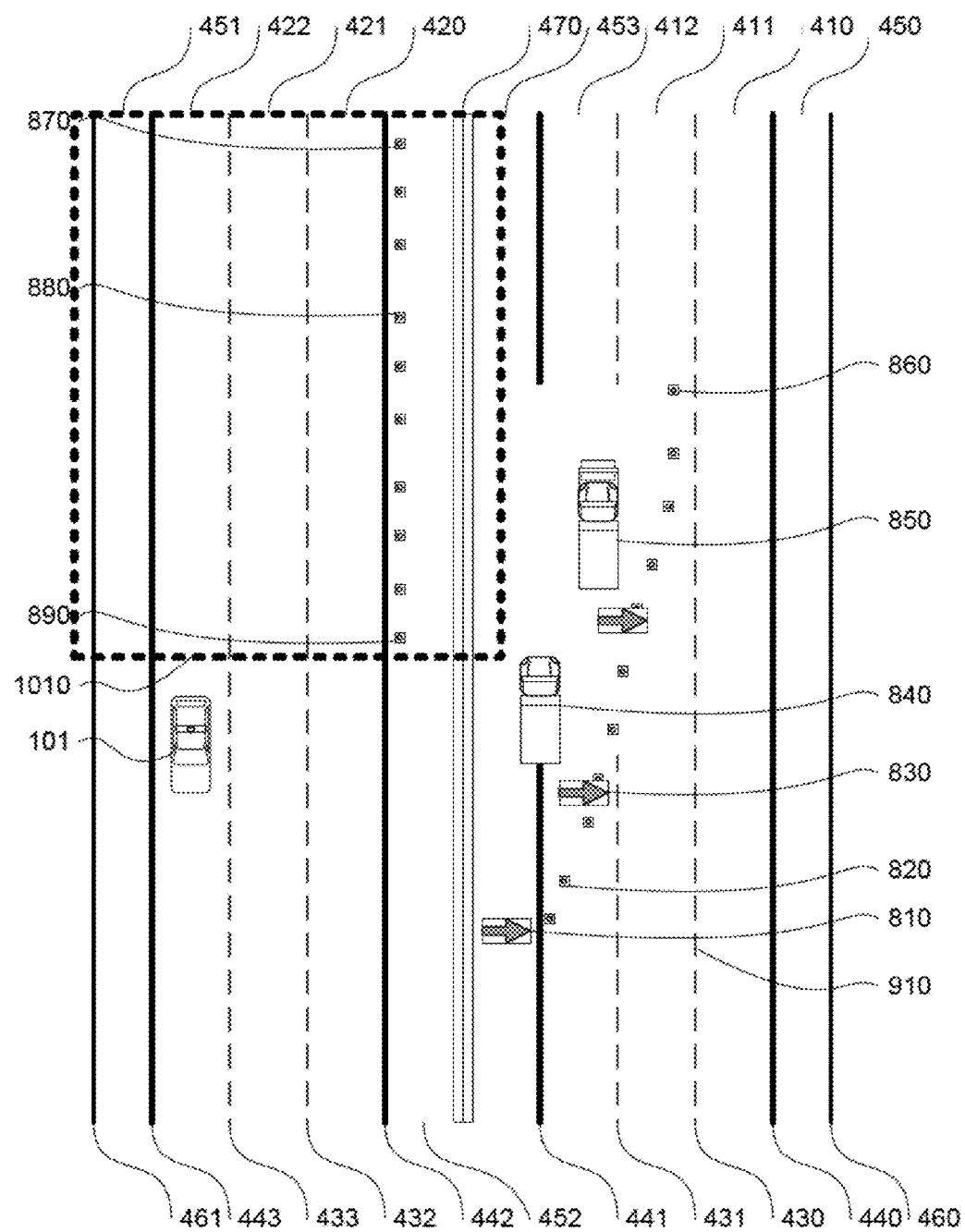
FIG. 10 is another example of the roadway of FIG. 4 in accordance with aspects of the disclosure.

Referring to the examples of FIGS. 8 and 9, construction zone 910 may be classified as active as portions of lane lines 441 and 431 do not appear (they have been paved over) and thus would be different from the detailed map information. In the example of FIGS. 8 and 10, construction zone 1010 may be classified as inactive as there would not be any differences from the detailed map information other than the appearance of the construction objects.

The aforementioned identifications and classifications of construction zones may be done at a later time by a computer other than that of the vehicle which collected the sensor information. For example, a computer such as server 720 may be used to process the sensor information in order to identify the construction objects and map a construction zone. Alternatively, this identification and classification may be performed by a computer of the vehicle that collected the sensor information, such as computer 110 of vehicle 101 as described above. By using a computer of the vehicle to do the identifications and classifications of construction zones in real time, this may increase the usefulness of the classification as described in more detail below.

The area of the construction zone and the classification information may be associated with one another and incorporated into detailed map information for vehicles having an autonomous driving mode. Thus, computer 110 may store this information in the detailed map information. FIG. 6 includes detailed map information 500 having construction zone areas 610 and 620 which may correspond to construction zone areas 910 and 1010 of FIGS. 9 and 10 stored in the detailed map information 136. Again, FIG. 6 includes classifications 630 and 640, which may correspond to construction zones 910 and 1010, respectively. This information may also be sent to other vehicles in order to provide those vehicles with the construction zone are and classification information. This may be done by broadcasting the information to nearby vehicles having an autonomous driving mode or simply by sending it to a central server such as server 720 which may relay the information to other vehicles having an autonomous driving mode.

Alternatively, if the identification and classification of a construction zone is performed by a computer such as server 720, the construction zones and associated classifications may be transmitted to other autonomous vehicles and stored with their respective detailed map information.

If the identification and classification of a construction zone is performed by an autonomous vehicle such as vehicle 101, this information may be stored directly with vehicle 101's detailed map information This information may also be shared with other vehicles in order to update their own detailed maps, for example, by sending it directly to specific vehicles, a broadcast to all other autonomous vehicles, or by sending it to a computer such as server 720 which may then send it to other autonomous vehicles.

At some later time, a second vehicle, such as vehicle 101, operating in an autonomous driving mode may detect a construction zone. This may be done by identifying a first construction object commonly associated with a construction zone as described above. Computer 110 of vehicle 101 may then query the detailed map information to determine whether there is a construction zone associated with the location of the identified first construction object. If not, computer 110 may proceed by mapping the construction zone, classifying the construction zone, storing this information with the detailed map information, and, in some examples, sending it to other autonomous vehicle as described above.

If the location of the identified first construction object is associated with the detailed map information, the computer 110 may also identify the classification associated with that construction zone and use the classification to determine how to drive the autonomous vehicle. Using the example above, when the construction zone is classified as active, the second vehicle may user a higher level of caution, by driving very slowly and perhaps transitioning from an autonomous to a manual mode. Similarly, when the construction zone is classified as inactive, the vehicle may continue to drive normally based on the detailed map information.

Computer 110 may also determine whether it becomes necessary to reclassify a construction zone, for example by changing the classification of a construction zone from active to inactive or inactive to active based upon the features of the roadway and the detailed map information as described above.

Figure 11:
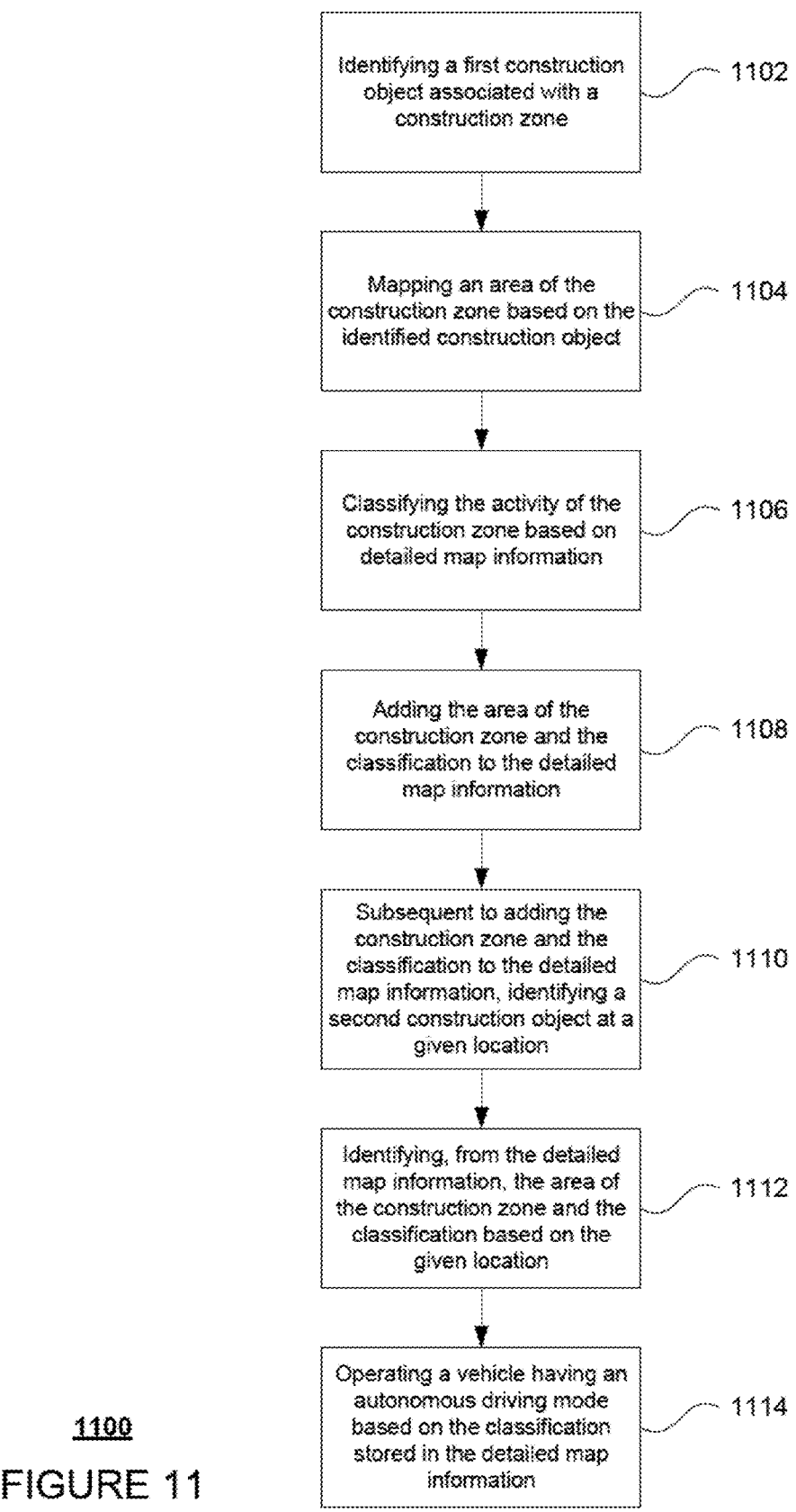
FIG. 11 is an example flow diagram in accordance with aspects of the disclosure.

Flow diagram 1100 of FIG. 11 is an example of some of the aspects described above which may be performed all or in part by computer 110 of vehicle 101. In this example, the computer identifies a first construction object associated with a construction zone at block 1102. An area of the construction zone is mapped based on the identified construction object at block 1104. The computer then classifies the activity of the construction zone based on detailed map information at block 1106. For example, a construction zones may be classified as active or inactive. The area of the construction zone and the classification are added to the detailed map information at block 1108.

Subsequent to adding the construction zone and the classification to the detailed map information, the computer identifies a second construction object at a given location at block 1110. The computer then identifies from the detailed map information, the area of the construction zone and the classification based on the given location at block 1112. The computer then operates a vehicle having an autonomous driving mode based on the classification stored in the detailed map information at block 1114.

In an alternative, rather than simply classifying a construction zone as active or inactive, other classifications schemes may be used. For example, the classifications may be associated with or simply be different pieces of information regarding how the vehicle should respond. As an example, some construction zones may have a time component, such as where road work on a highway is performed only during night hours (9:00 pm to 5:00 am, etc.). Thus, the vehicle need only be driven manually or extra cautiously close to these hours. In another example, there may be ongoing construction which only sometimes affects a particular lane. This is example, the computer 110 would need to know which lane is affected and what the computer 110 should look for when approaching the area, such as whether there are any cones near the particular lane, the computer 110 can be highly confident that the particular lane is in fact affected or closed. In another example, if the driving lanes are not affected by a construction project, but there is active work occurring close to the lanes on the shoulder, it may be safer to drive the vehicle slowly through the area of the construction zone, though not necessary. These details may also be associated with or simply used to classify the construction zone.

The features described above allow a vehicle having an autonomous driving mode to transition into another driving mode when there is a real need for it, but also to drive normally when there is not. As noted above without the classifications, the vehicle would always have to transition to the manual mode when it detects a construction object in order to promote a safe driving experience, even where it would not be necessary, such as in the example of construction zone area 1010/620. However, as noted above, because of the classification features provided above, the autonomous vehicle may continue in the autonomous mode. Thus, the classifications allow the vehicle's computer to make a much more informed decision about how to operate in a construction zone.

As these and other variations and combinations of the features discussed above can be utilized without departing from the subject matter as defined by the claims, the foregoing description of exemplary embodiments should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method comprising:
   receiving, by one or more processors, updated detailed map information identifying an area of a construction zone and a classification of an activity type of the construction zone as active or inactive, wherein the activity type of the construction zone is classified as active when the characteristics of the construction zone indicate that there have been changes to a roadway as compared to stored detailed map information;
   subsequent to receiving the updated detailed map information, identifying, by the one or more processors, a construction object at a given location;
   identifying, by the one or more processors, an area of the construction zone at the given location;
   accessing, by the one or more processors, the classification of the activity type of the construction zone from the detailed map information; and
   operating, by the one or more processors, a vehicle having an autonomous driving mode based on the accessed classification, wherein when the activity type of the construction zone is classified as active, operating the vehicle based on the classification includes operating the vehicle in a manual driving mode through the area of the construction zone.

2. The method of claim 1, further comprising, after operating the vehicle based on the accessed classification:
   reclassifying the activity type of the construction zone; and
   updating the classification of the construction zone in the detailed map information based on the reclassifying.

3. The method of claim 1, wherein operating the vehicle based on the classification includes determining whether to drive the vehicle in the autonomous driving mode or a manual driving mode.

4. The method of claim 1, wherein the updated detailed map information identifying the construction zone is further received with instructions for controlling driving behaviors of the vehicle in the area of the construction zone and wherein operating the vehicle is further based on the instructions for controlling the driving behaviors.

5. The method of claim 1, wherein one or both of the active or inactive classifications comprise one or both of a time component identifying when work at the construction zone will be performed or roadway lanes affected by construction at the construction zone.

6. The method of claim 2, further comprising sending the updated classification to another vehicle.

7. A system comprising:
   memory storing detailed map information
   one or more processors configured to:
   receive an updated detailed map information identifying a construction zone and a classification of an activity type of the construction zone as active or inactive, wherein the activity type of the construction zone is classified as active when the characteristics of the construction zone indicate that there have been changes to a roadway as compared to stored detailed map information;
   subsequent to receiving the updated detailed map information, identify a construction object at a given location;
   identify an area of the construction zone at the given location;
   accessing the classification of the activity type of the construction zone from the detailed map information; and
   operate a vehicle having an autonomous driving mode based on the accessed classification, wherein when the activity type of the construction zone is classified as active, operating the vehicle based on the classification includes operating the vehicle in a manual driving mode through the area of the construction zone.

8. The system of claim 7, wherein the one or more processors are further configured to, after operating the vehicle based on the accessed classification:
   reclassify the activity type of the construction zone; and
   update the classification of the construction zone in the detailed map information based on the reclassifying.

9. The system of claim 7, wherein operating the vehicle based on the classification includes determining whether to drive the vehicle in the autonomous driving mode or a manual driving mode.

10. The system of claim 7, wherein the updated detailed map information identifying the construction zone is further received with instructions for controlling driving behaviors of the vehicle in the area of the construction zone and wherein operating the vehicle is further based on the instructions for controlling the driving behaviors.

11. The system of claim 7, wherein one or both of the active or inactive classifications comprise one or both of a time component identifying when work at the construction zone will be performed or roadway lanes affected by construction at the construction zone.

12. The system of claim 7, wherein operating the vehicle based on the classification.

13. The system of claim 8, wherein the one or more processors are further configured to send the updated classification to a remote computer.

14. A non-transitory, tangible machine readable medium on which instructions are stored, the instructions, when executed by one or more processors, cause the one or more processors to perform a method, the method comprising:
   receiving updated detailed map information identifying a construction zone and a classification of an activity type of the construction zone as active or inactive, wherein the activity type of the construction zone is classified as active when the characteristics of the construction zone indicate that there have been changes to a roadway as compared to stored detailed map information;
   subsequent to receiving the updated detailed map information, identifying a construction object at a given location;
   identifying an area of a construction zone at the given location;
   accessing the classification of the activity type of the construction zone from the detailed map information; and
   operating a vehicle having an autonomous driving mode based on the accessed classification, wherein when the activity type of the construction zone is classified as active, operating the vehicle based on the classification includes operating the vehicle in a manual driving mode through the area of the construction zone.

15. The medium of claim 14, wherein the method further comprises, after operating the vehicle based on the accessed classification:
   reclassifying the activity type of the construction zone; and
   updating the classification of the construction zone in the detailed map information based on the reclassifying.

16. The medium of claim 14, wherein operating the vehicle based on the classification includes determining whether to drive the vehicle in the autonomous driving mode or a manual driving mode.

17. The medium of claim 14, wherein the updated detailed map information identifying the construction zone is further received with instructions for controlling driving behaviors of the vehicle in the area of the construction zone and wherein operating the vehicle is further based on the instructions for controlling the driving behaviors.

18. The medium of claim 14, wherein one or both of the active or inactive classifications comprise one or both of a time component identifying when work at the construction zone will be performed or roadway lanes affected by construction at the construction zone.

19. The medium of claim 15, wherein the method further comprises sending the updated classification to a remote computer.

20. The method of claim 1, wherein the updated detailed map information is received from one or more processors in a vehicle having an autonomous driving mode.

* * * * *